United States Patent [19]
Otani et al.

[11] Patent Number: 5,385,768
[45] Date of Patent: Jan. 31, 1995

[54] ELECTRICALLY CONDUCTIVE FILM

[75] Inventors: Yuzo Otani, Tokyo; Naohiro Takeda, Yokohama, both of Japan

[73] Assignee: Diafoil Company, Limited, Tokyo, Japan

[21] Appl. No.: 53,344

[22] Filed: Apr. 28, 1993

Related U.S. Application Data

[63] Continuation of Ser. No. 713,079, Jun. 11, 1991, abandoned.

[30] Foreign Application Priority Data

Jun. 14, 1990 [JP] Japan .................................. 2-155651

[51] Int. Cl.$^6$ .............................................. B32B 27/40
[52] U.S. Cl. .................... 428/141; 252/510; 252/511; 428/143; 428/323; 428/408; 428/423.1; 428/423.7; 428/480; 428/910; 524/495; 524/496
[58] Field of Search ............... 428/141, 323, 408, 143, 428/423.1, 423.7, 480, 910; 252/510, 511; 524/495, 496

[56] References Cited

U.S. PATENT DOCUMENTS

| | | | |
|---|---|---|---|
| 3,639,245 | 2/1972 | Nelson | 430/109 |
| 4,250,398 | 2/1981 | Ellis et al. | 219/345 |
| 4,476,189 | 10/1984 | Posey et al. | 428/910 |
| 4,585,687 | 4/1986 | Posey et al. | 428/195 |
| 4,612,273 | 9/1986 | Westdale et al. | 430/98 |
| 4,740,426 | 4/1988 | Tremper, III | 428/423 |
| 5,188,891 | 2/1993 | Takeda et al. | 428/323 |

FOREIGN PATENT DOCUMENTS 62-173253  7/1987  Japan .
2-160552   6/1990  Japan .

*Primary Examiner*—D. S. Nakarani
*Attorney, Agent, or Firm*—Oblon, Spivak, McClelland, Maier & Neustadt

[57] ABSTRACT

There is disclosed an electrically conductive polyester film comprising a polyester base film and a coating layer which is formed by applying a coating liquid to said base film, thereafter stretching the coated film and heat-setting the film, wherein said coating liquid is an aqueous composition and contains carbon black in an amount of 30–60% by weight of the solid content and produces a layer when dried at 80° C. for 10 minutes, the rupture elongation of said layer being at least 300% and is heat-settable at 10°–200° C., and said coating layer having a surface resistivity of $10^4$–$10^{10}$ Ω/□ and a surface roughness of not more than 0.05 μm. This polyester film exhibits good electric resistivity and light-shielding proper.

2 Claims, No Drawings

ELECTRICALLY CONDUCTIVE FILM

This application is a continuation of application Ser. No. 07/713,079, filed on Jun. 11, 1991, now abandoned.

FIELD OF THE INVENTION

This invention relates to an electrically conductive polyester film having a smooth surface, excellent light-shielding property and solvent resistance.

BACKGROUND OF THE INVENTION

Biaxially stretched polyester films are widely used as materials for magnetic recording media, electronic appliances, etc. because of their excellent mechanical properties, electrical properties and chemical resistance. However, they have a resistivity of $10^{15-1016}$ $\Omega/\square$ and are easily charged with electricity. Therefore, they are susceptible to troubles caused by adherence of dust and other foreign materials when they are used as magnetic recording media or materials for electronic appliances or tapes therefor and suffer troubles when tapes thereof travel on appliances.

For the prevention of electrostatic charging of polyester films, it is conventional to apply an ionic-conductive antistatic material such as a surfactant or an electronic-conductive antistatic material such as carbon black to the film surface or to incorporate an antistatic material into the base polymer.

For economically producing conductive films having non-humidity-dependent antistaticity, there have been proposed methods, which comprise applying an electronic-conductive fine powder such as carbon black by the application-drawing method in the course of manufacturing polyester films as disclosed in Japanese Laid-Open Patent Publication Nos. 1-267830 and 2-67335.

When a coating material containing a large amount of conductive fine powder is used in the application-drawing method, however, the coating layer suffers minute cracking and a smooth surface suitable for magnetic recording media or materials for electronic appliances cannot be obtained. Therefore, there has been a need for improvement of polyester films in this respect.

We conducted an intensive study regarding the above-described need, we have found that a flat conductive film having excellent light-shielding property can be obtained by applying a coating composition having specific properties to the surface of base films by the application-drawing method.

DISCLOSURE OF THE INVENTION

The present invention provides an electrically conductive film comprising a polyester film substrate at least one surface of which is coated with a coating composition and drawn, said film being characterized in that:

said coating composition is an aqueous coating liquid which contains carbon black in an amount of 30–60% by weight of the solid content, produces a layer having a rupture elongation of not less than 300% at 80° C. when dried at 80° C. for 10 min. and is heat-settable at 10°–200° C.;

the surface resistivity of the coating layer is at $10^{4-1010}$ $\Omega/\square$, and the surface roughness (Ra) of the coating layer is not larger than 0.05 μm.

The polyester film which constitutes the substrate of the conductive film of the present invention is a film of a poly(ethylene terephthalate) in which ethylene terephthalate occupies not less than 80 mol % thereof or of a poly(ethylene naphthalate) in which ethylene naphthalate occupies not less than 80 mol % thereof.

The polyester film which constitutes the substrate of the film of the present invention may contain particles which are added or precipitated in the course of manufacturing the film in order to form protrusions on the surface of the film or a polymer different from the above-described polyester.

Those skilled in the art can select a suitable polyester for the present invention from the known polyesters considering the orientation, crystallinity, mechanical properties, dimensional stability, etc. and modify these properties.

The substrate film for the present invention can be a single layer film, a two-layer film or a three layer film with an intermediate layer of a light-shielding material which is formed by a coextruding process.

The application-drawing method employed in the present invention is carried out during the film forming step and the drawing and heat-setting are effected after the coating composition has been applied to the surface as disclosed in Japanese Patent Publication (Kokoku) No. 41-8470, and elsewhere.

The coating liquid can be applied onto the surface of an unstretched polyester film in accordance with any of the processes described in "Kohtingu Hohshiki" by Yuji Harasaki published by Maki Shoten (1979) for instance, i.e., by a reverse roll coater, a gravure coater, a rod coater or an air doctor knife coater or other coating apparatuses and the film is biaxially stretched simultaneously or stepwise. Alternatively, the coating liquid can be applied to a polyester which has been stretched in one direction and the film can thereafter be stretched in the direction perpendicular to the direction of the previous drawing. Or a biaxially stretched polyester film having a coating layer applied thereto can be further stretched. Or the coating liquid can be applied to the surface of a biaxially stretched film and further stretched longitudinally or laterally.

The above-described stretching step is preferably conducted at a temperature of 60°–130° C. The film is usually stretched by a factor of 6–20. The stretched film is usually heat-treated at a temperature of 50°–250° C.

A preferred process is as follows. A polyester film is stretched in one direction by roller stretching at 60°–130° C. by a factor of 2–6, a coating liquid is applied thereon and suitably dried, or without drying, the film is further stretched in the direction perpendicular to the direction of the previous stretching and finally heat treated at 150°–250° C. for 1–600 seconds.

The process of the present invention enables simultaneous drying of the coating layer and stretching of the film and the thickness of the coating layer is reduced in accordance with the stretching ratio and thus is able to provide polyester films suitable for use as the substrate of magnetic recording media at a relatively low cost.

The present invention is characterized in that a specific coating liquid is employed in the coating step. Specifically, the coating liquid is an aqueous liquid containing carbon black in an amount of 30–60 wt % of the solid contents and gives a layer which has a rupture elongation of not less than 300% after drying at 80° C. for 10 minutes and is heat-settable at 10°–200° C.

If the amount of carbon black in the solid contents is less than 30 wt%, the light-shielding property is insufficient. On the other hand, with more than 60 wt% carbon black, the ductility of the coating layer deteriorates and the coating layer suffers cracking when stretched and the conductivity and light-shielding also deteriorate.

Carbon blacks of the conductivity grade and the pigment grade can be used in the present invention providing good conductivity and light-shielding effect.

The carbon black should have an average particle size of 0.01–0.2 μm. Particles having an average particle size of less than 0.01 μm increases the viscosity of the coating liquid, although depending on the content thereof, deteriorating the handling property and coatability of the liquid. Particles having an average particle size of more than 0.2 μm markedly coarsen the surface of the coating layer.

The aqueous coating liquid in accordance with the present invention gives a layer whose rupture elongation is 300% or more when dried at 80° C. for 10 minutes. Therefore, the formed layer does not suffer cracking when stretched and produces a final uniform layer.

The aqueous liquid is heat-settable at 110°–200° C. and the resulting coating layer has sufficient heat resistance and abrasion resistance.

Such a coating liquid can be obtained by suitably selecting binder resins and combining them.

The binder resin usable in the aqueous coating liquid in accordance with the present invention can be either water-soluble or water-dispersible. The binder should preferably be such that it uniformly disperses carbon black so as to make a uniform coating liquid, strongly adheres to the polyester base film to be integrated therewith and that has high heat resistance. Specific examples are aqueous resins such as polyesters, polyurethane, epoxy resins, melamine resins, etc.

When non-heat-settable resins are used as binders for the aqueous coating liquid in accordance with the present invention, they can be made heat-settable at 110°–200° C. by addition of a crosslinker or crosslinkers. Such crosslinkers include heat-settable crosslinkers such as methylolated or alkylolated urea resins, melamine resins, guanamine resins, acrylamide compounds, epoxy compounds, azylidine compounds, block isocyanate compounds, silane couplers, zircoaluminate couplers, etc.

The film of the present invention can be obtained by using the above-described coating liquid. The film of the present invention has a surface electric resistivity of $10^4$–$10^{10}$ Ω/□. The surface resistivity can be regulated by the amount of the antistatic agent to be added. However, if the antistatic agent is used in an excessive amount, the resulting layer will suffer cracking degrading the film utility.

The surface roughness (Ra) should preferably be not more than 0.05 μm. With an Ra of more than 0.05 μm, the reverse side of the coating layer is too coarse and the film is not usable.

In accordance with the present invention, the thickness of the coating layer should preferably be 0.2–1.5 μm. With a thickness of less than 0.2 μm, satisfactory conductivity and light-shielding effect are not exhibited. Thicknesses of more than 1.5 μm provide no further improvement inductivity and light-shielding property.

The coating layer in accordance with the present invention may contain other fine particles in addition to carbon black for the purpose of improving blocking property and slipperiness. Either inorganic or organic particles can be used for this purpose. The coating liquid in accordance with the present invention may contain a surfactant or the like for the purpose of improving coatability and stability.

The electrically conductive film of the present invention has excellent flatness, light-shielding property and chemical resistance. Therefore, it is useful as a material for magnetic recording media, electronic appliances, etc. and thus has high industrial value.

DESCRIPTION OF SPECIFIC EMBODIMENTS OF THE INVENTION

Now the invention will be specifically described by way of working examples. However, the invention is not limited to these examples only within the claimed scope of the invention.

(1) Measurement of Surface Roughness Ra

Centerline average surface roughness Ra was measured in accordance with JIS B0601 as follows.

A surface roughness curve was obtained by scanning the surface of a sample over a length of 25 mm using Surfcorder SE-3F, a surface roughness measuring apparatus marketed by Kosaka Kenkyusho, with a contact stylus PUDJ (diameter: 20 μm) under a load of 30 mg at a rate of 0.1 mm/sec, and magnifying the scanned length by a factor of 10 and the perpendicular movement of the stylus by a factor of 50,000. The scanned length L of the curve along the center line was taken and the curve was expressed as y=f(x) with the centerline as the abscissa and the perpendicular direction as the ordinate. Ra defined as $$Ra = 1/L \int_0^L |f(x)|\, dx$$

is expressed in μm. The cutoff value was 0.08 mm. An average of the values of 10 points out of the 12 points measured excluding the maximum and minimum values was calculated.

(2) Measurement of Surface Resistivity

Surface resistivity was measured with a resistance meter "4329" marketed by Yokogawa-Hewlett Packard by applying a voltage of 100 V by means of a concentric electrode "1G008A" of Yokogawa-Hewlett Packard with an inner pole measuring 50 mm in diameter and outer pole measuring 70 mm in diameter.

(3) Measurement of Light-Shielding Effect

Transmittance of the total light from a white light source of a sample was measured by an integrating turbidimeter in accordance with JIS K6714.

(4) Evaluation of Solvent Resistance

A 150 mm x 200 mm piece of "Bencott" (gauge-like non-woven fabric) manufactured by Asahi Kasei K. K. was folded in four and put on the coating layer of a film sample. Onto the center of the folded piece, 0.2 ml of toluene was dropped and the piece was pressed with a metal weight of 100 g. After one minute the piece with the weight were drawn at a rate of 8 cm/sec. If no change was observed on the coating layer, it was judged acceptable.

(5) Measurement of Rupture Elongation

The coating liquid was applied to aluminum foil to a thickness of 50 μm in wet state and dried at 80° C. After drying, the coating layer was peeled off from the foil and rupture elongation was measured by "Tensilon" (a tensile strength tester) with thermostat at 80° C.

Example 1

A polyester containing added fine particles and having a intrinsic viscosity of 0.65 was melt-extruded at 280°-300° C. and cast onto a cooled drum with simultaneous use of the static adhering method. Thus an amorphous film having a thickness of 175 μm was obtained. This film was stretched longitudinally at 90° C. by a factor of 3.5. To this film, a coating liquid $A_1$ the composition of which is given below, was applied to a thickness of 18 μm (in wet state), whereafter the film was laterally stretched by a factor of 3.5 and heat-treated at 210° C. Thus a biaxially stretched polyester film was obtained. The thickness of the base film was 14.3 μm and the thickness of the coating layer was 0.9 μm.

Coating Liquid $A_1$

The ingredients and the contents were as shown below. This coating liquid gave a layer of which the rupture elongation at 80° C. was 600% and was heat-set at 150° C.

Aqueous dispersion of carbon black (Mitsubishi Kasei #3170) 40 parts

Aqueous dispersion of polyurethane a (Softening point: 90° C.) 50 parts

Alkylol melamine 10 parts

Water 400 parts

Example 2

The procedures of Example 1 were repeated using the following coating liquid $A_2$ and a biaxially stretched polyester film was obtained.

Coating Liquid $A_2$

Aqueous dispersion of carbon black (Mitsubishi Kasei #3170) 40 parts

Aqueous dispersion of polyurethane a (Softening point: 90° C.) 25 parts

Aqueous dispersion of polyurethane b (Softening point: 150° C.) 25 parts

Alkylol melamine 10 parts

Water 400 parts

Comparative Example 1

The procedures of Example 1 were repeated using a coating liquid B as indicated below and a biaxially stretched polyester film was obtained.

Coating Liquid B

This coating liquid gave a layer of which the rupture elongation was 600% at 80° C. This layer was not heat-set.

Aqueous dispersion of carbon black (Mitsubishi Kasei #3170) 40 parts

Aqueous dispersion of polyurethane a (Softening point: 90° C.) 60 parts

Water 400 parts

Comparative Example 2

The procedures of Example 1 were repeated using a coating liquid C as indicated below and a biaxially stretched polyester film was obtained.

Coating Liquid C

This coating liquid gave a layer of which the rupture elongation was 200% and was heat set at 150° C.

Aqueous dispersion of carbon black (Mitsubishi Kasei #3170) 40 parts

Aqueous dispersion of polyurethane b (Softening point: 150° C.) 50 parts

Alkylol melamine (Curing temp.:150° C.) 10 parts

Water 400 parts

Comparative Example 3

The procedures of Example 1 were repeated using a coating liquid D as indicated below and a biaxially stretched polyester film was obtained.

Coating Liquid D

This coating liquid gave a layer of which rupture elongation was 500% at 80° C. This layer was heat-set before the temperature reached 100° C.

Aqueous dispersion of carbon black (Mitsubishi Kasei #3170) 40 parts

Aqueous dispersion of polyurethane a (Softening point: 90° C.) 50 parts

Azylidine compound (Softening point: 100° C.) 10 parts

Water 400 parts

Comparative Example 4

The procedures of Example 1 were repeated using a coating liquid E as indicated below and a biaxially stretched polyester film was obtained.

Coating Liquid E

This coating liquid gave a layer of which rupture elongation was 600% at 80° C. This layer was heat-set at 150° C.

Aqueous dispersion of carbon black (Mitsubishi Kasei #3170) 15 parts

Aqueous dispersion of polyurethane a (Softening point: 90° C.) 70 parts

Alkylol melamine (Curing point: 150° C.) 15 parts

Water 400 parts

The results are summarized in Table 1.

TABLE 1

| | Rupture Elongation of Dried Coating at 80° C. (%) | Heat-setting Temp. of Coating (°C.) | Carbon Black Conc. (wt %) | Surface Roughness of Coating Ra (μ) | Surface Resisting of Coating (Ω/□) | Light Transmittance of Film (%) | Solvent Resistance of Coating |
|---|---|---|---|---|---|---|---|
| Example 1 | 600 | 150 | 40 | 0.028 | $1 \times 10^6$ | 1.5 | ○ |
| Example 2 | 350 | 150 | 40 | 0.045 | $5 \times 10^5$ | 1.8 | ○ |
| Compara. Example 1 | 600 | — | 40 | 0.029 | $5 \times 10^5$ | 1.4 | X |
| Compara. Example 2 | 150 | 150 | 40 | 0.093 | $1 \times 10^{12}$ | 7.0 | ○ |
| Compara. | 500 | <100 | 40 | 0.065 | $5 \times 10^7$ | 3.2 | ○ |

TABLE 1-continued

| | Rupture Elongation of Dried Coating at 80° C. (%) | Heat-setting Temp. of Coating (°C.) | Carbon Black Conc. (wt %) | Surface Roughness of Coating Ra ($\mu$) | Surface Resisting of Coating ($\Omega/\square$) | Light Transmittance of Film (%) | Solvent Resistance of Coating |
| --- | --- | --- | --- | --- | --- | --- | --- |
| Example 3 | | | | | | | |
| Compara. Example 4 | 600 | 150 | 15 | 0.020 | $1 \times 10^{13}$ | 5.0 | ○ |

What we claim is:

1. An electrically conductive polyester film comprising a polyester base film and a coating layer which is formed by applying a coating liquid to said base film, thereafter stretching said coated film and heat-setting said film, wherein said coating liquid is an aqueous composition comprising a polyurethane resin, an alkylol melamine and carbon black having an average particle size of 0.01–0.2 $\mu$m in an amount of 30–60% by weight of the solid content and produces a layer when dried at 80° C. for 10 minutes, the rupture elongation of said layer being at least 300% at 80° C. and is cross-linkable at 10°–200° C., and said coating layer has a surface resistivity of $10^4$–$10^{10}$ $\Omega/\square$, and a surface roughness (Ra) of not more than 0.05 $\mu$m.

2. The polyester film as recited in claim 1, wherein the polyester is a poly(ethylene terephthalate) in which ethylene terephthalate accounts for not less than 80 mol of the constituents or poly(ethylene naphthalate) in which ethylene naphthalate accounts for not less than 80 mol % of the constituents.

* * * * *